US012800049B2

(12) United States Patent
Robin

(10) Patent No.: US 12,800,049 B2
(45) Date of Patent: Nov. 17, 2026

(54) THERMOSTATIC CARTRIDGE, AND MIXER TAP INCLUDING SUCH A THERMOSTATIC CARTRIDGE

(71) Applicant: VERNET, Ollainville (FR)

(72) Inventor: Guillaume Robin, Montgeron (FR)

(73) Assignee: VERNET, Ollainville (FR)

( * ) Notice: Subject to any disclaimer, the term of this patent is extended or adjusted under 35 U.S.C. 154(b) by 38 days.

(21) Appl. No.: 19/111,236

(22) PCT Filed: Sep. 12, 2023

(86) PCT No.: PCT/EP2023/074983
§ 371 (c)(1),
(2) Date: Mar. 12, 2025

(87) PCT Pub. No.: WO2024/056644
PCT Pub. Date: Mar. 21, 2024

(65) Prior Publication Data

US 2026/0092653 A1 Apr. 2, 2026

(30) Foreign Application Priority Data

Sep. 13, 2022 (FR) ...................................... 2209167

(51) Int. Cl.
*F16K 31/00* (2006.01)
*F16K 11/00* (2006.01)
(Continued)

(52) U.S. Cl.
CPC ............ *F16K 31/002* (2013.01); *F16K 11/07* (2013.01); *F16K 19/006* (2013.01);
(Continued)

(58) Field of Classification Search
CPC ...... F16K 31/002; F16K 11/07; F16K 19/006; F16K 27/041; F16K 2200/501; G05D 23/1353; G05D 23/1393
See application file for complete search history.

(56) References Cited

U.S. PATENT DOCUMENTS

| | | | | |
|---|---|---|---|---|
| 8,074,893 | B2 * | 12/2011 | Mace | G05D 23/1353 236/12.11 |
| 8,453,942 | B2 | 6/2013 | Jager | |

(Continued)

FOREIGN PATENT DOCUMENTS

| | | | |
|---|---|---|---|
| FR | 2 921 709 A1 | 4/2009 | |
| FR | 3 108 414 A1 | 9/2021 | |
| WO | WO-2019/138027 A1 | 7/2019 | |

OTHER PUBLICATIONS

International Search Report for PCT Patent Application No. PCT/EP2023/074983, mailed Nov. 8, 2023, 4 pages.

*Primary Examiner* — Patrick C Williams
(74) *Attorney, Agent, or Firm* — MARSHALL, GERSTEIN & BORUN LLP

(57) ABSTRACT

The invention relates to a cartridge which comprises a casing to be fitted integrally in a tap body, as well as a thermostatic element controlling the position of a slide valve for regulating the temperature of a mixed fluid formed by mixing hot and cold fluids in a chamber of the casing. The cartridge comprises a turbine supported by the casing by being arranged in the chamber so as to be rotated about an axis of the chamber by the mixed fluid flowing in the chamber towards a mixed fluid outlet. The cartridge incorporates at least one permanent magnet, supported by the turbine so as to be rotated about the axis together with the turbine, and at least one coil fixedly arranged on an outer face of the casing through which the hot and cold fluids enter the chamber, so that the magnet generates an electric current
(Continued)

in the coil by electromagnetic induction when the turbine rotates.

10 Claims, 6 Drawing Sheets

(51) Int. Cl.
*F16K 11/07* (2006.01)
*F16K 27/04* (2006.01)
*G05D 23/13* (2006.01)

(52) U.S. Cl.
CPC ....... *F16K 27/041* (2013.01); *G05D 23/1353* (2013.01); *G05D 23/1393* (2013.01); *F16K 2200/501* (2021.08)

(56) References Cited

U.S. PATENT DOCUMENTS

2010/0276500 A1* 11/2010 Rivlin ................ G05D 23/1393 236/12.12
2020/0341497 A1 10/2020 Mace et al.
2023/0112960 A1 4/2023 Maugerard

* cited by examiner

THERMOSTATIC CARTRIDGE, AND MIXER TAP INCLUDING SUCH A THERMOSTATIC CARTRIDGE

FIELD

The present invention relates to a thermostatic cartridge. The invention further relates to a mixer tap comprising such a thermostatic cartridge.

BACKGROUND

WO 2019/138027 discloses a thermostatic regulation device which is available in various embodiments. The thermostatic control device includes a body having an internal chamber into which hot and cold fluid separately penetrate via respective inlets to mix therewith to form a mixed fluid before the mixed fluid exits the chamber via a mixed fluid outlet. To this end, the thermostatic regulating device comprises a thermostatic system for mixing the incoming hot and cold fluids and for adjusting the temperature of the outgoing mixed fluid. The thermostatic control device further includes a turbine generator for generating an electric current which is sent to an electronic circuit via an electric link integrated into the body of the thermostatic regulation device. As explained in WO 2019/138027, the turbine generator typically includes a hollow stator, inside which a rotor with blades is provided, and an electromagnetic circuit which generates an output electrical voltage when the rotor rotates. WO 2019/138027 specifies that the turbine generator thereof is incorporated into the body of the thermostatic regulation device thereof, being either housed entirely inside a sleeve of the aforementioned body or arranged totally inside a main body of the aforementioned body. In practice, WO 2019/138027 recommends resorting, for the turbine generator thereof, to an "axial micro-turbine" which is precisely designed to be housed entirely in the mixing chamber, delimited inside the body of the thermostatic regulation device thereof.

SUMMARY

The invention relates more generally to the field of sanitary installations for dispensing a fluid, in particular for dispensing water, such as a shower, a bathtub or a washbasin. To regulate the temperature of a mixture of a hot fluid and a cold fluid, in particular a mixture of hot and cold water in a sanitary installation, it is known how to use a thermostatic element and a slide valve, which are arranged in a hollow outer casing. As soon as the casing is ready to be directly mounted in one piece in a tap body, while being previously assembled to the thermostatic element and to the slide valve, the corresponding assembly is commonly referred to as a "thermostatic cartridge", the assembly being suitable for being installed as a single unit in the tap body. The thermostatic element comprises a piston, which is normally fixed with respect to the casing, and a thermosensitive body, with respect to which the piston can be moved in translation along an axis under the effect of a thermal expansion of the thermostatic element, the slide valve being rigidly attached to the thermosensitive body. The slide valve is mounted movable along the inner axis of a chamber of the casing so as to close, in opposite respective proportions, a first passage, which is axially delimited between the slide valve and the casing and which is supplied with hot fluid through a hot fluid inlet delimited by the casing, and a second passage, which is axially delimited between the slide valve and the casing and which is supplied with cold fluid through a cold fluid, inlet delimited by the casing. The hot fluid and the cold fluid which the slide valve lets through the two passages so as to reach the chamber, mix therein and form, downstream of the slide valve, a mixed fluid which flows in the chamber along the thermosensitive body of the thermostatic element until leaving the casing. By changing the position of the piston with respect to the casing, usually by means of an ad hoc control mechanism, the thermostatic regulation temperature can be set, i.e. the balancing temperature around which the temperature of the mixed fluid is regulated. An example of such type of cartridge is provided by FR 2 921 709.

With the development of connected objects and home automation applications, there is now a desire that, in addition to the main fluid dispensing function, sanitary installations can send and/or receive and/or process electronic data, which leads to instrumenting mixer taps, by adding electrical and/or electronic components to thereto. However, the presence of the electrical and/or electronic components within a mixer tap, more particularly with a thermostatic cartridge, induces various constraints related in particular to the leak-tightness conditions with respect to the fluids circulating in the mixer tap, as well as to the problem of supplying the electrical and/or electronic components with electricity. In this respect, there are hydroelectric modules: such a module, which is directly mounted in the tap body independently of the thermostatic cartridge, makes it possible to provide, inside the tap body, an electrical signal that can be used for various purposes. In practice, the hydroelectric modules are complicated to install and connect inside the tap body, more particularly in the presence of a thermostatic cartridge.

The goal of the present invention is to propose a new thermostatic cartridge which is particularly practical and efficient.

To this end, the subject matter of the invention is a thermostatic cartridge as defined in claim 1.

A further subject matter of the invention is a mixer tap as defined in claim 8.

One of the ideas underlying the invention is to seek to integrate a hydroelectric turbine with a thermostatic cartridge so as to have an assembly suitable for being installed as one piece in a tap body. To this end, the thermostatic cartridge according to the invention incorporates both a rotary turbine, supporting at least one permanent magnet and moved by the mixed fluid flowing downstream of a slide valve regulated in position by a thermostatic element, and at least one coil wherein an electric current is induced by the magnetic field of the permanent magnet(s) during the rotation of the turbine. A casing of the thermostatic cartridge, which is designed to be directly mounted in one piece in a tap body, supports both the turbine, equipped with the permanent magnet(s), and the coil(s): the turbine and the permanent magnet(s) which same supports are arranged inside the casing, more precisely in a chamber of the latter where the mixed fluid flows, whereas the coil(s) are arranged outside the casing, more precisely on an outer face of the casing where it is possible both to efficiently seal the coil(s) with respect to the fluids incoming and outgoing from the casing and to easily connect the coil(s) so as to recover therefrom the electricity which is generated therein by electromagnetic induction. As explained hereinafter, the aspects relating to what is electrically connected to the coil or coils are not limiting for the invention. In any case, the thermostatic cartridge according to the invention combines a function of thermostatic regulation of the mixed fluid and a function of hydroelectric production, in the form of a unit, or assembly, which is both autonomous, i.e. which is sufficient as such from the hydraulic and electrical point of view, and can be fitted as a single unit inside the tap body of the mixer tap according to the invention. The thermostatic cartridge according to the invention is thereby particularly practical and efficient, in particular in preparation for instrumenting the mixer tap according to the invention. The presence of the turbine in the chamber, just downstream of the thermostatic element, can advantageously make it possible to dispense with integrating a turbulator into the thermostatic cartridge. Moreover, as discussed in detail below, the thermostatic cartridge, according to the embodiment thereof, and the corresponding mixer tap further have additional advantages and benefits.

Advantageous additional features of the thermostatic cartridge according to the invention and/or of the mixer tap according to the invention are specified in the other claims.

BRIEF DESCRIPTION OF THE DRAWINGS

The invention will be better understood upon reading the following description, given only as an example and making reference to the drawings, wherein.

DETAILED DESCRIPTION

Figure 1:
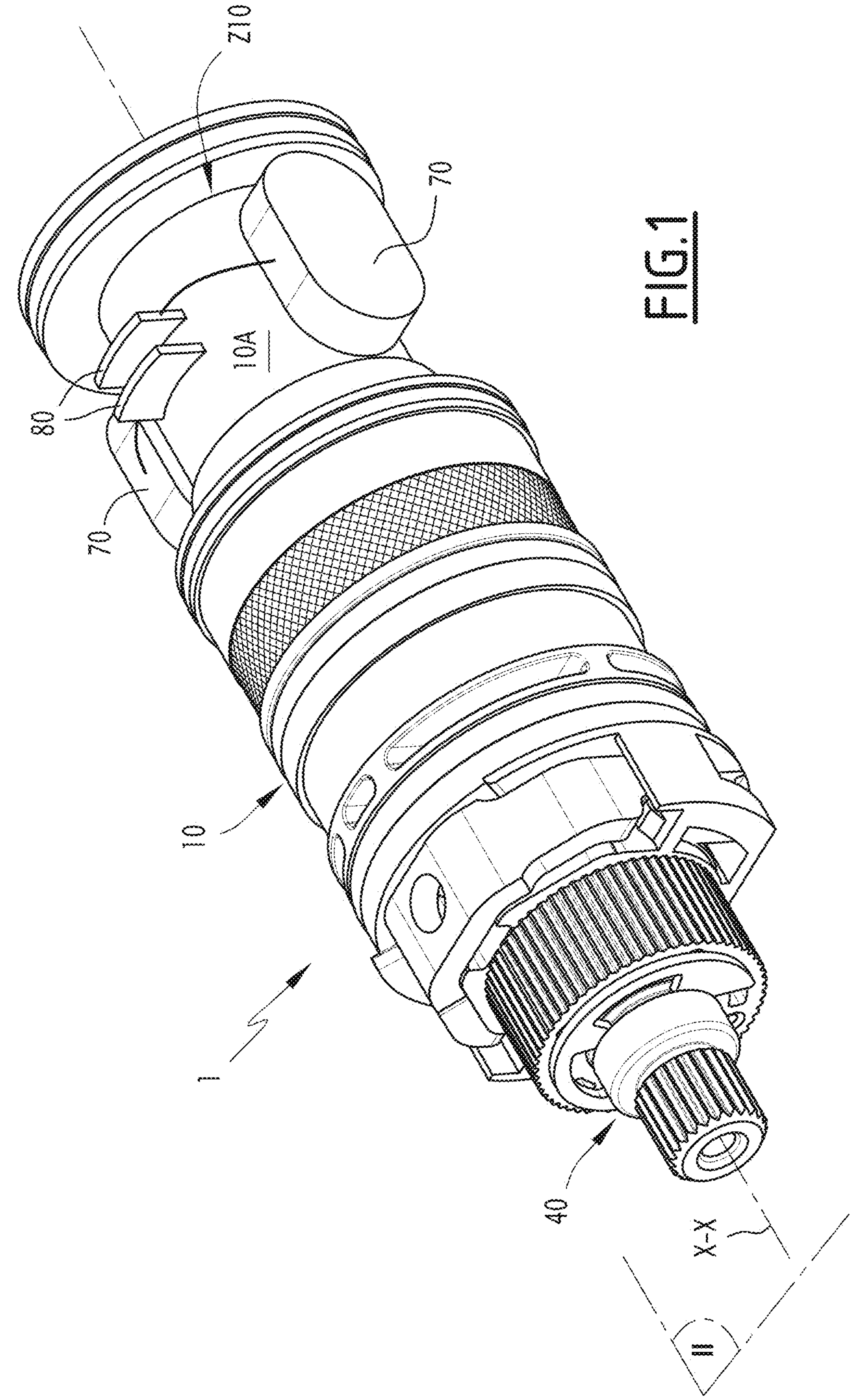
FIG. 1 is a perspective view of first embodiment of a cartridge according to the invention.
Figure 2:
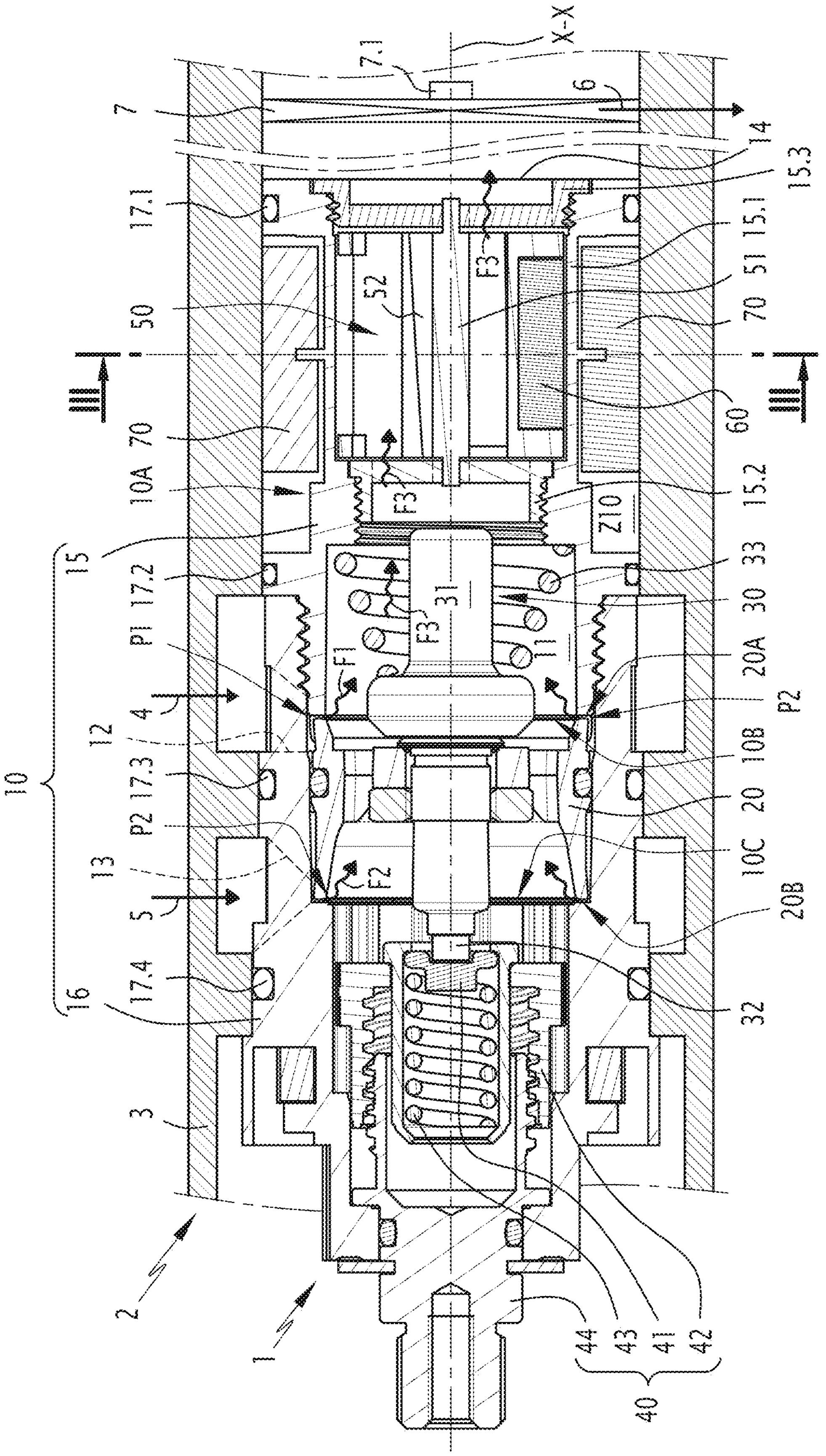
FIG. 2 is a section in plane II of FIG. 1, the thermostatic cartridge being shown schematically within a mixer tap according to the invention.
Figure 3:
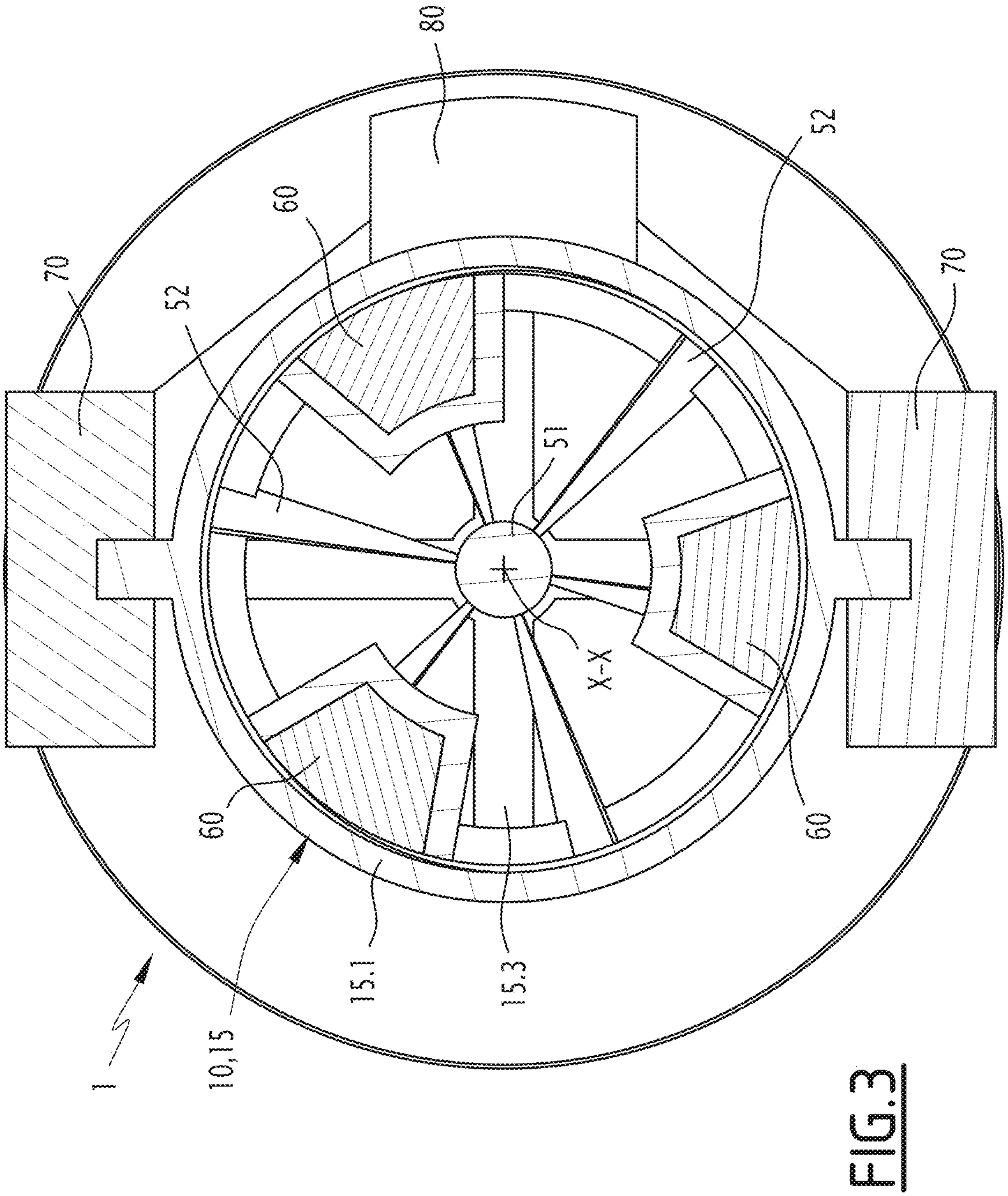
FIG. 3 is a section of the thermostatic cartridge along the line III-III shown in FIG. 2.

FIGS. 1 to 3 show a thermostatic cartridge 1 arranged about and along a geometrical axis X-X. The thermostatic cartridge 1 is suitable for equipping an installation supplied with a hot fluid and a cold fluid which are to be mixed by the thermostatic cartridge 1 to form a mixed fluid. The thermostatic cartridge 1 is more particularly suitable for thereby equipping a mixer tap 2, shown only partially and schematically in FIG. 2 and dispensing the mixed fluid, in particular mixed water resulting from the mixing of hot water and cold water by the thermostatic cartridge 1, the mixer tap 2 belonging to a sanitary installation such as a shower, a bathtub or a washbasin.

Before describing the thermostatic cartridge 1 in detail, one first examines another component of the mixer tap 2, namely the tap body 3 thereof inside which the thermostatic cartridge 1 is arranged in the assembled state of the mixer tap 2. According to an embodiment which is both practical and suited for the needs of the sanitary market, which is implemented in the embodiment considered in the figures, the tap body 3 has an overall tubular shape, centered on a geometric axis which is substantially aligned with the axis X-X of the thermostatic cartridge 1 in the assembled state of the mixer tap 2.

Whatever the embodiment thereof, the tap body 3 is provided with:

- a hot fluid inlet 4, which is indicated only schematically in FIG. 2 by an arrow and which is intended to be supplied with the hot fluid and to feed the latter into the tap body 3,
- a cold fluid inlet 5, which is indicated only schematically in FIG. 2 by an arrow and which is intended to be supplied with the cold fluid and feed the latter into the tap body 3, and
- a mixed fluid outlet 6, which is indicated only schematically in FIG. 2 by an arrow and which is intended to discharge the mixed fluid outside the tap body 3, allowing the mixed fluid to flow from the inside to the outside of the tap body 3.

Also, before describing the thermostatic cartridge 1 in detail, it should be noted that, in the embodiment illustrated in FIG. 2, the mixer tap 2 comprises yet another component, namely a flow-rate regulating device 7. The flow-rate regulating device 7 is shown only very schematically in FIG. 2, with the proviso that the embodiment thereof is not limiting.

Whatever the embodiment thereof, the flow-rate regulating device 7 is arranged inside the tap body 3 so as to act on the flow of mixed fluid inside the tap body, before the flow reaches the mixed fluid outlet 6 and is discharged outside the tap body 3. The flow-rate regulating device 7 serves to regulate the flow-rate of the mixed fluid which is sent to the mixed fluid outlet 6 from the thermostatic cartridge 1, before the mixed fluid exits the tap body 3 via the mixed fluid discharge 6. The flow-rate regulating device 7 is thereby used to switch the mixer tap 2 between a closed state, in which the flow-rate of the mixed fluid at the mixed fluid discharge 6 is zero, to the nearest leak, and an open state, in which the mixed fluid flows into the mixed fluid outlet 6 with a non-zero flow-rate permitting a normal use of the mixer tap 2. In practice, the flow-rate regulating device 7 advantageously makes it possible, when the mixer tap 2 is in the open state, to adjust the value of the flow-rate of the mixed fluid flowing into the mixed fluid outlet 6.

As an example, the flow-rate regulating device 7 is a ceramic disk system, with the proviso that other embodiments, well known in the art, can be envisaged.

In practice, the flow-rate regulating device 7 is advantageously controlled by a button 7.1 or a similar control member, which is accessible to the user from outside the tap body 3 and which is typically movable relative to the tap body 3, in particular in rotation about the axis X-X, for the purpose of controlling the flow-rate regulating device 7.

The thermostatic cartridge 1 includes, as the main external component, a hollow casing 10. The casing 10 is designed to be directly mounted in one piece in the tap body 3.

The casing 10 has an internal volume which forms a chamber 11 centered on the axis X-X. In other words, the casing 10 delimits the chamber 11 internally. The mixing of the hot fluid and of the cold fluid that the thermostatic cartridge 1 operates to form the mixed fluid is carried out in the chamber 11.

The casing 10 is provided with, distinct from each other:

- a hot fluid inlet 12, which connects the outside of the casing 10 to the chamber 11 and through which the hot fluid enters the chamber from outside the casing 10, more precisely from an outer face 10A of the casing 10,
- a cold fluid inlet 13 which connects the outside of the casing 10 to the chamber 11 and through which the cold fluid enters the chamber from the outside of the casing 10, more precisely from the outside face 10A of the latter, and a mixed fluid discharge 14, which connects the chamber 11 to the outside of the casing 10 and through which the mixed fluid flows from the chamber 11 to the outside of the casing 10.

In the embodiment considered in the figures, the casing 10 has an overall tubular shape, which is centered on the axis X-X and the outer lateral face of which forms the outer face 10A. The hot fluid inlet 12 and the cold fluid inlet 13 each extend from the chamber 11 transversely, or even radially, to the axis X-X. As for the mixed fluid discharge 14, same extends from the chamber 11 parallel to the axis X-X, even being substantially centered on the axis.

For various reasons, more particularly related to the assembly of the thermostatic cartridge 1, the casing 10 advantageously includes, as in the embodiment considered in the figures, two housings 15 and 16 distinct from one another, which follow one another along the axis X-X, possibly partially overlapping one another, the housing 15 delimiting the mixed fluid discharge 14. In the assembled state of the thermostatic cartridge 1, the housings 15 and 16 are fixedly secured to each other, herein by screwing, with the proviso that other means of securing can be envisaged. The chamber 11 is delimited jointly by the housings 15 and 16, being formed successively along the axis X-X by an internal volume of the housing 15 and an internal volume of the housing 16. Similarly, the outer face 10A is delimited partly by the housing 15 and, for the rest, by the housing 16. In the embodiment considered in the figures, the hot fluid inlet 12 and the cold fluid inlet 13 are delimited by the housing 16, but alternative embodiments are conceivable in this respect.

In any case, in the assembled state of the mixer tap 2, the hot fluid inlet 12, the cold fluid inlet 13 and the mixed fluid discharge 14 are, inside the tap body 3, connected to the hot fluid inlet 4, the cold fluid inlet 5 and the mixed fluid discharge 6, respectively. The different connections are leak-tight with respect to the corresponding fluids, herein by means of the seals 17.1, 17.2, 17.3 and 17.4 which are supported by the casing 10, more particularly on the outer face 10A of the latter, and which, in the assembled state of the mixer tap 2, are pressed, more particularly radially to the axis X-X, between the casing 10 and the tap body 3. In the embodiment considered in the figures, the seals 17.1 and 17.2 are supported by the housing 15 whereas the seals 17.3 and 17.4 are supported by the housing 16, it being noted that other layouts are possible in variants not shown.

The thermostatic cartridge 1 further includes a slide valve 20 which is mounted inside the chamber 11 so as to be apt to move along axis X-X between two end positions, namely:

a first end position, wherein a seat 20A of the slide valve 20, which is located at a lower axial first end of the slide valve, bears axially against a seat 10B of the casing 10, which is located along axis X-X, substantially at the coming out of the hot fluid inlet 12 inside the chamber 11, and a second end position, wherein a seat 20B of the slide valve 20, which is located at an upper axial end of the slide valve 20, bears against a seat 10C of the casing 10, which is located, along axis X-X, substantially at the coming out of the cold fluid inlet 13 inside the chamber 11.

In the form of embodiment considered in the figures, the seat 10B of the casing 10 is formed by the housing 15, more precisely herein by an axial end edge of the latter, whereas the seat 10C is formed by the housing 16, more precisely herein by an inner shoulder of the latter.

In any case, the axial dimension of the slide valve 20 separating the opposite seats 20A and 20B thereof from each other is less than the axial distance separating the seats 10B and 10C of the casing 10 from each other. Thereby, the seat 20A of the slide valve 20 and the seat 10B of the casing 10 delimit therebetween, along the axis X-X, a hot fluid passage P1 through which the hot fluid inlet 12 comes out into the chamber 11. Similarly, the seat 20B of the slide valve 20 and the seat 10C of the casing 10 define therebetween, along the axis X-X, a cold fluid passage P2 through which the cold fluid inlet 13 comes out into the chamber 11.

It should be understood that, when the slide valve 20 is in the first end position thereof, the slide valve closes the hot fluid passage P1 and thus completely closes, to the nearest leak, the hot fluid inlet inside the chamber 11, while opening as much as possible the cold fluid inlet in the chamber via the open cold fluid passage P2. Conversely, when the slide valve 20 is in the second end position thereof, the slide valve closes the cold fluid passage P2 and thus completely closes, to the nearest leak, the cold fluid inlet inside the chamber 11, while opening as much as possible the hot fluid inlet in the chamber via the hot fluid passage P1. Of course, depending on the position of the slide valve 20 along the axis X-X between the first and second end positions, the respective closures of the hot fluid passage P1 and the cold fluid passage P2 vary inversely, which amounts to saying that the quantities of hot fluid and cold fluid inside the chamber 11 are regulated, in respective inverse proportions, by the slide valve 20 according to the axial position thereof. In FIG. 2, the slide valve 20 occupies an intermediate position between the first and second end positions. Moreover, the flow of hot fluid in the hot fluid passage P1 and the flow of cold fluid in the cold fluid passage P2 are indicated by arrows F1 and F2, respectively, whereas the flow of mixed fluid in the chamber 11, more particularly downstream of the slide valve 20, up to the discharge of mixed fluid 14, is indicated by arrows F3.

To drive the slide valve 20 in translation along the central axis X-X, the thermostatic cartridge 1 includes a thermostatic element 30 which includes a thermosensitive body 31 and a piston 32 which, in the assembled state of the thermostatic cartridge 1, are substantially centered on the axis X-X. The thermostatic element 30 is designed so that the thermosensitive body 31 thereof and the piston 32 thereof move with respect to each other along the axis X-X, such relative movement being controlled by a temperature variation applied to the thermosensitive body 31 and being driven by the thermostatic element 30 as such. To this end, the thermosensitive body 31 contains e.g. a thermally expandable material which, during the expansion thereof, triggers the deployment of the piston 32 with respect to the thermosensitive body 31 and which, during the contraction thereof, allows the piston to be retracted with respect to the thermosensitive body. Other forms of thermal actuation are conceivable for the thermostatic element 30. In all cases, so that the relative axial movement between the thermosensitive body 31 and the piston 32 is controlled by the temperature of the mixed fluid contained in the chamber 11, the thermosensitive body 31 is at least partially arranged in the chamber 11 so as to be in contact with the mixed fluid.

The thermosensitive body 31 is secured to the slide valve 20, e.g. by screw fastening, it being stressed that the embodiment of the rigid attachment between the slide valve 20 and the thermosensitive body 31 is not limiting and, above all, that the rigid attachment extends as a kinematic connection from one to the other for the purpose of moving the slide valve for closing, in respective inverse proportions, the passages of hot fluid P1 and cold fluid P2. The piston 32 is connected to the casing 10 by a mechanism, referenced 40 and detailed below.

Assuming that the mechanism 40 holds the position of the piston 32 fixed along the axis X-X with respect to the casing 10, the temperature of the mixed fluid at the mixed fluid discharge 14 is regulated thermostatically by the slide valve 20 and the thermostatic element 30. Indeed, under such assumption, the temperature of the mixed fluid results directly from the respective quantities of hot fluid and of cold fluid fed into the chamber 11 via the hot fluid passage P1 and the cold fluid passage P2 respectively, which are closed off by the slide valve 20 to a greater or lesser extent, as explained hereinabove. If the supply of hot and/or cold fluid to the thermostatic cartridge 1 is disturbed and e.g. the temperature of the mixed fluid increases, the piston 32 axially extends with respect to the thermosensitive body 31, which makes the thermosensitive body 31 and thus the slide valve 20 move towards the discharge of the mixed fluid 14: the proportion of hot fluid circulating through the hot fluid passage P1 decreases whereas, conversely, the proportion of cold fluid circulating through the cold fluid passage P2 increases, leading to a decrease of the temperature of the mixed fluid. A reverse reaction occurs when the temperature of the mixed fluid decreases, and it should be noted that a compression spring 33 is provided for returning the thermostatic body 31 and the piston 32 toward each other when the piston retracts, e.g. during a contraction of the thermally expandable material contained in the thermosensitive body 31. In practice, it should be understood that the return spring 33 is interposed axially between, on the one hand, the casing 10 or a part fixedly connected to the latter and, on the other hand, the thermosensitive body 31 or a part fixedly connected to the latter. Herein, the return spring 33 is thereby interposed axially between the housing 15 and the thermosensitive body 31. The temperature corrections of the mixed fluid result in a regulation equilibrium for the temperature of the mixed fluid, at a thermostatic regulation temperature which depends on the position, as imposed by the mechanism 40, of the piston 32 along the axis X-X.

The mechanism 40 can be used for adjusting the value of the thermostatic regulation temperature and thus for controlling the temperature of the fluid, by acting on the axial position of the piston 32. The mechanism 40 is supported by the casing 10, herein by the housing 16. In the example of embodiment illustrated in the figures, the mechanism 40 includes a stop 41 against which the end of the piston 32, axially opposite the thermosensitive body 31, bears axially and which is mounted so as to slide along the axis X-X inside a nut 42, with the axial interposition between the stop 41 and the nut 42 of an overtravel spring 43. The axial position of the nut 42 inside the casing 10 and, consequently, the altitude of the stop 41, can be modified by an adjusting screw 44, which is centered on the axis X-X and the end of which, axially opposite the thermostatic element 30, emerges from the casing 10, herein the housing 16, so as to be connected in rotation with a maneuvering handle, not shown in the figures. At the end thereof oriented toward the thermostatic element 30, the adjusting screw 44 is screwed into the nut 42, the latter being connected in rotation about the axis X-X to the casing 10, herein the housing 16, typically by means of splines. Thereby, when the screw 44 is rotated on itself about the axis X-X, the nut 42 is translated along the axis, which triggers the corresponding drive of the stop 41 by means of the overtravel spring 43, being stressed that the overtravel spring 43 is substantially stiffer than the return spring 33.

The structure and the operation of the mechanism 40 will not be described herein further, since it is understood that the reader can refer to FR 2 869 087 for such purpose. It will be recalled that the embodiment of the mechanism 40 is not limited to: other embodiments are known in the [prior] art, e.g. from FR 2 921 709, FR 2 774 740 and FR 2 870 611. Moreover, as a variant (not shown), if the value of the temperature at which the slide valve 20 regulates the mixture of hot fluid and cold fluid is not regulated, the mechanism 40 can be eliminated from the thermostatic cartridge 1, the piston 32 then being fixedly connected to the casing 10.

In addition to the slide valve 20 and to the thermostatic element 30 which, as explained in detail hereinabove, impart a thermostatic regulation function on the thermostatic cartridge 1, the latter incorporates other components, which impart thereto a hydroelectric production function and which will be discussed in detail hereinbelow.

Thereby, the thermostatic cartridge 1 includes a turbine 50 which is designed to partially transform the flow energy of the mixed fluid into mechanical energy, by rotating the turbine 50 on itself. More precisely, the turbine 50 is supported by the casing 10 so as to be able to rotate about the axis X-X, being arranged in the chamber 11 so as to be rotated relative to the casing 10 by the mixed fluid flowing in the chamber toward the mixed fluid outlet 14.

As can be seen clearly in FIG. 2, the turbine 50 is thereby placed in the chamber 11, downstream of the slide valve 20 and of the thermostatic element 30 and upstream of the mixed fluid discharge 14, along the direction of flow of the mixed fluid in the chamber 11. It follows that, according to a practical and effective arrangement, the turbine 50 is supported by the housing 15 of the casing 10, being movable in rotation about the axis X-X on the housing 15. To this end, in the embodiment envisaged in the figures, the housing 15 advantageously includes a tubular wall 15.1, which is centered on the axis X-X and inside which the turbine 50 is arranged coaxially. According to a preferred dimensioning which improves the driving performance of the turbine 50 by the mixed fluid flowing inside the tubular wall 15.1, the inside diameter of the latter is substantially adjusted to the outside diameter of the turbine 50, as can be seen clearly in FIG. 3; in other words, the passage section of the tubular wall 15.1 is, over the axial extent of the latter where the turbine 50 is located, substantially adjusted to the section swept by the turbine 50 when the latter is rotated. Moreover, the housing 15 advantageously includes bearings 15.2 and 15.3 which support and guide in rotation about the axis X-X, a central hub 51 of the turbine 50, the central hub 51 being aligned with the axis X-X. Herein, the bearings 15.2 and 15.3 are located at the axial ends, respectively, of the central hub 51, the bearing 15.3 being located, along the axis X-X, substantially at the mixed fluid discharge 14. The bearings 15.2 and 15.3 are arranged inside the tubular wall 15.1 and are fixedly connected to the latter by any appropriate means, herein by screw fastening. In practice, the bearings 15.2 and 15.3 are perforated in order to allow therethrough, in particular along the direction of the axis X-X, the mixed fluid flowing in the chamber 11 toward the mixed fluid discharge 14; the corresponding apertures of the bearing 15.3 are visible in FIG. 3, whereas, in FIG. 2, the corresponding apertures of the bearings 15.2 and 15.3 are indicated schematically in dotted lines.

Whatever the embodiment of the turbine 50 and the arrangement thereof in the chamber 11, the specific features of the turbine 50 relating to the rotation thereof by the mixed fluid flowing in the chamber 11 are not limiting. In this respect, according to a practical and reliable embodiment, shown in the figures, the turbine 50 is provided with blades 52 or functionally similar elements, on which the flow of the mixed fluid in the chamber 11 acts mechanically. Herein, the blades 52 or the functionally similar elements protrude transversely to the axis X-X from the central hub 51.

Also in connection with the hydroelectric production function mentioned hereinabove, the thermostatic cartridge 1 includes permanent magnets 60 and coils 70, together forming an alternator generating electricity.

The permanent magnets 60, which are provided herein in three units but the number of which is not limiting, are supported by the turbine 50 so as to be rotated about the axis X-X together with the turbine 50. According to a simple and practical embodiment, which is shown in the figures, the permanent magnets 60 are thereby fixedly supported by the turbine 50, in particular being connected in rotation about the axis X-X to the turbine 50. To this end, multiple possibilities of assembly between the turbine 50 and the permanent magnets 60 are conceivable, in particular by overmolding, by matching shapes, by directly mounted mechanical anchoring, etc. In any case, the permanent magnets 60 are advantageously arranged on the outer periphery of the turbine 50, being spaced from the axis X-X at the same radial spacing and being regularly distributed about the axis X-X, as can be seen clearly in FIG. 3.

As can be seen clearly in FIGS. 1 to 3, the coils 70 are fixedly supported by the casing 10, being arranged on the outer face 10A of the casing 10 in such a way that the permanent magnets 60 generate in the coils 70, an electric current by electromagnetic induction when the turbine 50 rotates about the axis X-X with respect to the casing 10. In other words, during the rotation of the turbine 50, the magnetic field generated by the permanent magnets 60 induces an electric current in the coils 70, such electromagnetic induction being well known per se. In practice, the electric current generated in the coils 70 is an alternating current. It should be noted that, in the example illustrated in the figures, the coils 70 are provided in two units which are diametrically opposite with respect to the axis X-X. However, the number of the coils 70 is not limiting the invention, it being noted that it is well known that the number has an influence on the characteristics, in particular the phase characteristics, of the electric current generated in the coil or coils 70 which are actually present.

According to a practical and effective arrangement, which is shown in the figures, the coils 70 are supported by the housing 15 of the casing 10, being fixedly mounted on the part of the outer face 10A delimited by the housing 15. More particularly, as can be seen clearly in FIGS. 2 and 3, the coils 70 and the permanent magnets 60 are arranged on both sides, radially to the axis X-X, of the tubular wall 15.1 of the housing 15. Moreover, the radial thickness of the tubular wall 15.1 advantageously corresponds to the radial spacing between the coils 70 and the permanent magnets 60, to within assembly and operating clearances. Of course, to enable electromagnetic induction to produce the effects thereof, the tubular wall 15.1 is made of a material transparent to the magnetic field generated by the permanent magnets 60, e.g. a plastic material.

In any case, the coils 70 are advantageously arranged in a dry zone Z10 that the casing 10, herein the housing 15, delimits on the outer surface 10A. The dry zone Z10 is leak-tight with respect to hot, cold and mixed fluids, herein by the seals 17.1 and 17.2. In the assembled state of the mixer tap 2, the dry zone Z10 is closed by the tap body 3 and thereby forms a compartment of the internal volume of the tap body 3, which is sealed off from the rest of the internal volume.

In operation, as soon as mixed fluid flows in the chamber 11 toward the mixed fluid discharge 14, the corresponding flow of mixed fluid rotates the turbine 50 about the axis X-X and, consequently, the permanent magnets 70, inducing the electric current in the coils 70 by electromagnetic induction.

The electricity generated in the coils 70 can be used in many ways, without such aspect limiting the invention. In the embodiment shown in FIGS. 1 to 3, the coils 70 are connected in series with each other and the two terminals thereof are connected, by wire connection, to two electrical connection pins 80, respectively. The electrical connection pins 80, which are thereby supplied with electricity by the coils 70 and which are advantageously arranged in the dry zone Z10, can be as such connected to multiple other electrical and/or electronic components to be supplied with electricity, not shown in FIGS. 1 to 3.

Figure 4:
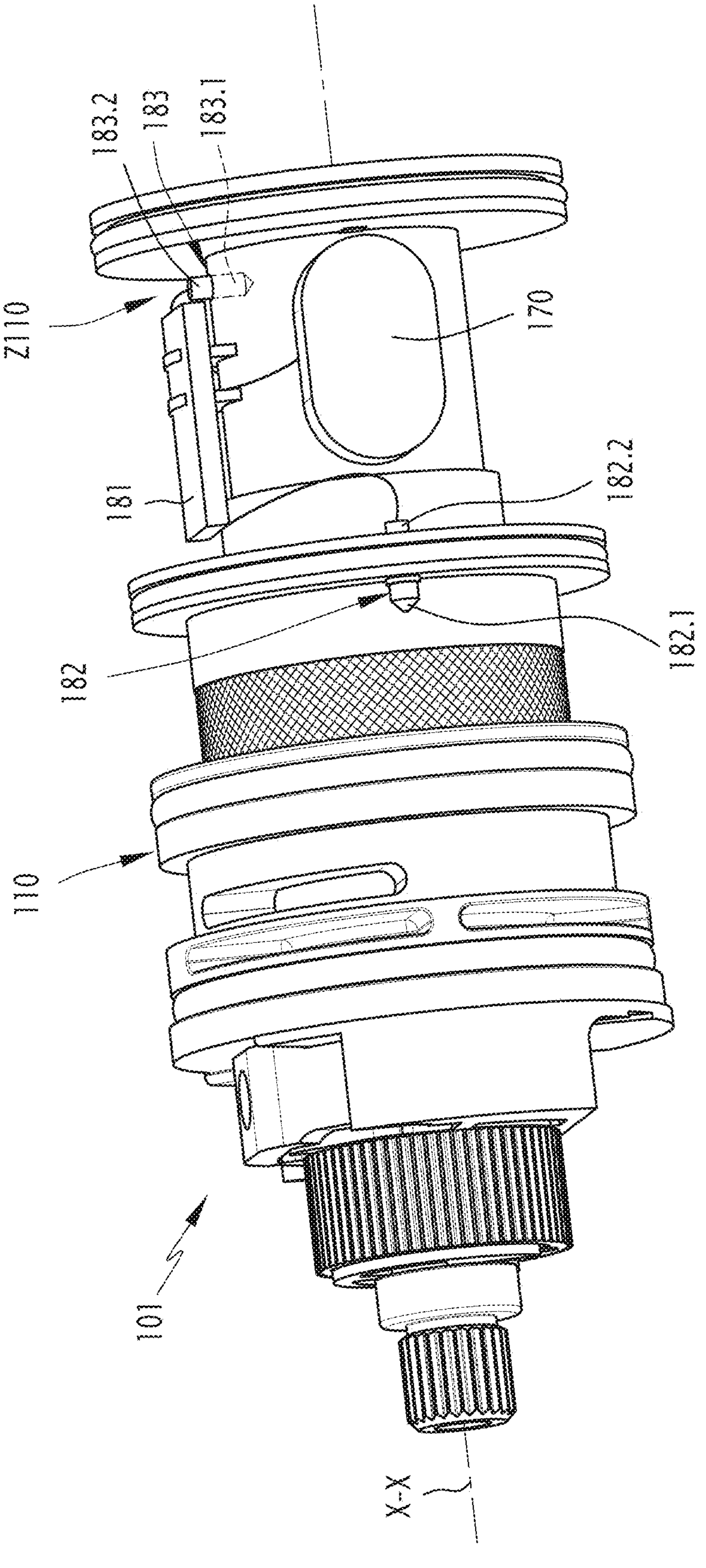
FIG. 4 is a view similar to FIG. 1, illustrating a second embodiment of a thermostatic cartridge according to the invention.

FIG. 4 shows a thermostatic cartridge 101 which is functionally similar to the cartridge 1 and which, in this respect, comprises, inter alia, a casing 110 which is functionally, or even structurally, similar to the casing 10. The casing 110 delimits, on the outer surface thereof, a dry zone Z110 which is functionally, or even structurally, similar to the dry zone Z10. The thermostatic cartridge 101 differs from the thermostatic cartridge 1 by arrangements relating to electrical and/or electronic components supplied with electricity by the hydroelectric production function of the thermostatic cartridge 101.

More precisely, the thermostatic cartridge 101 comprises coils 170, which are functionally, or even structurally, similar to the coils 70, only one of the coils 170 being visible in FIG. 4. The terminals of the coils 170 are connected to conductors of a printed circuit 181 arranged in the dry zone Z110. Herein, the printed circuit 181 includes an insulating support which is mechanically supported by the outer face of the casing 110.

In addition, the thermostatic cartridge 101 comprises one or a plurality of temperature sensors, provided herein in two units and referenced as 182 and 183, respectively. The sensors 182 and 183 are supported by the casing 110 passing through the latter in a sealed manner. As can be seen clearly in FIG. 4, the sensor 182 extends, herein substantially parallel to the axis X-X, from an end 182.1, interacting by contact with the hot fluid, at the hot fluid inlet or just upstream thereof, at an end 182.2, emerging in the dry zone Z110 and providing an electrical signal representative of the effect of temperature on the end 182.1. The sensor 182 thereby makes it possible to measure the temperature of the hot fluid entering the thermostatic cartridge 101. The sensor 183 extends, herein transversely to the axis X-X, from an end 183.1, interacting by contact with the mixed fluid, at the mixed fluid outlet or just upstream thereof, to an end 183.2, emerging in the dry zone Z110 and providing an electrical signal representative of the effect of the temperature on the end 183.1. The sensor 183 thereby makes it possible to measure the temperature of the mixed fluid leaving the thermostatic cartridge 101. Such arrangement of the temperature sensors 182 and 183 takes advantage of the integrated arrangement of the components of the hydroelectric generation function of the thermostatic cartridge 101. Herein, the electrical signals supplied by the sensors 182 and 183, respectively, are supplied to the printed circuit 181.

Thereby, the presence of the dry zone Z110 where the coils 170 are housed enables the thermostatic cartridge 101 to integrate and supply with electricity, the printed circuit 181 and the temperature sensors 182 and 183 in a reliable and efficient manner. Thereof illustrates the multiplicity of electrical and/or electronic components that can thereby be integrated into the thermostatic cartridge according to the invention.

Figure 5:
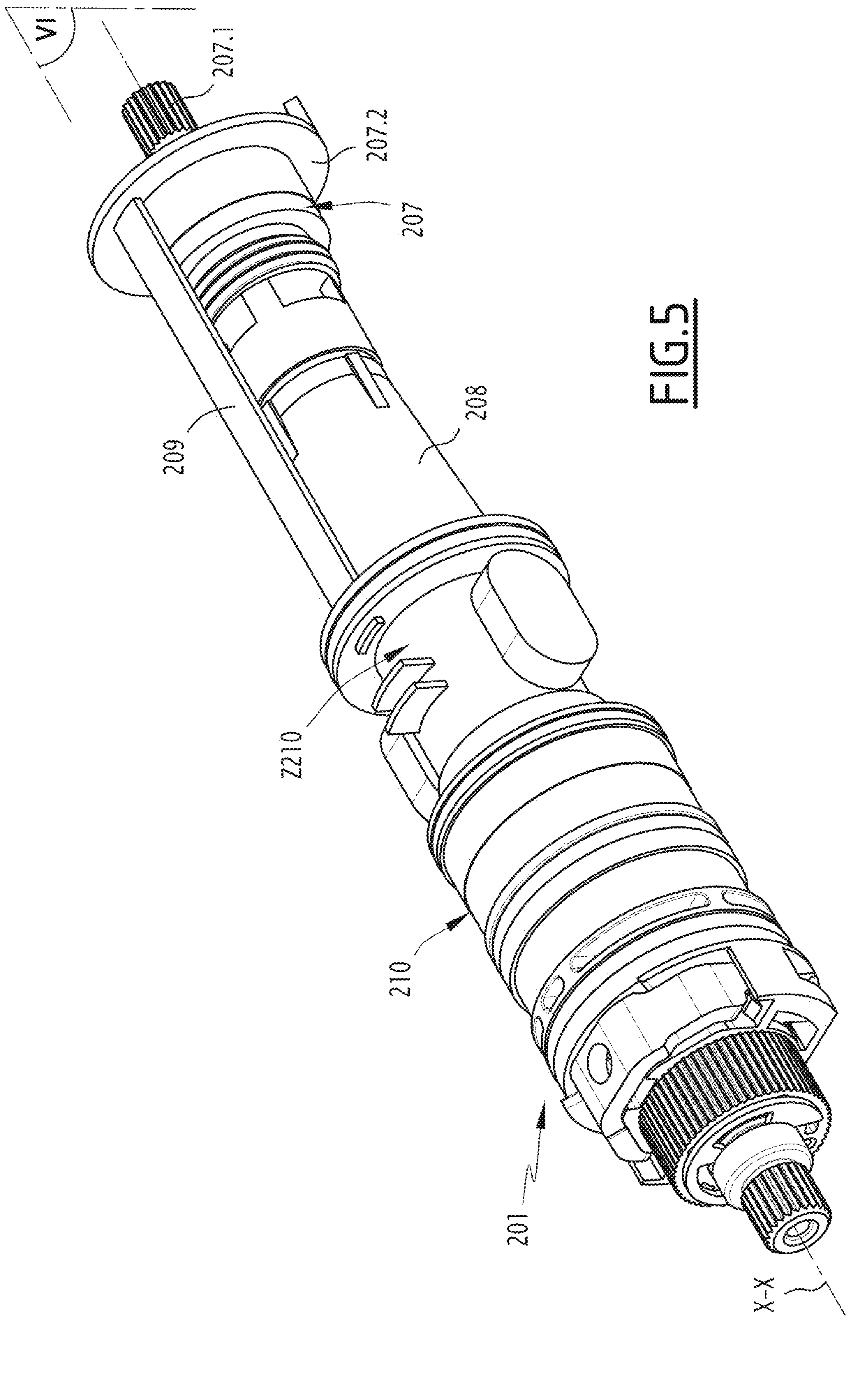
FIG. 5 is a view similar to FIG. 1, illustrating a third embodiment of a third embodiment of a thermostatic cartridge according to the invention.
Figure 6:
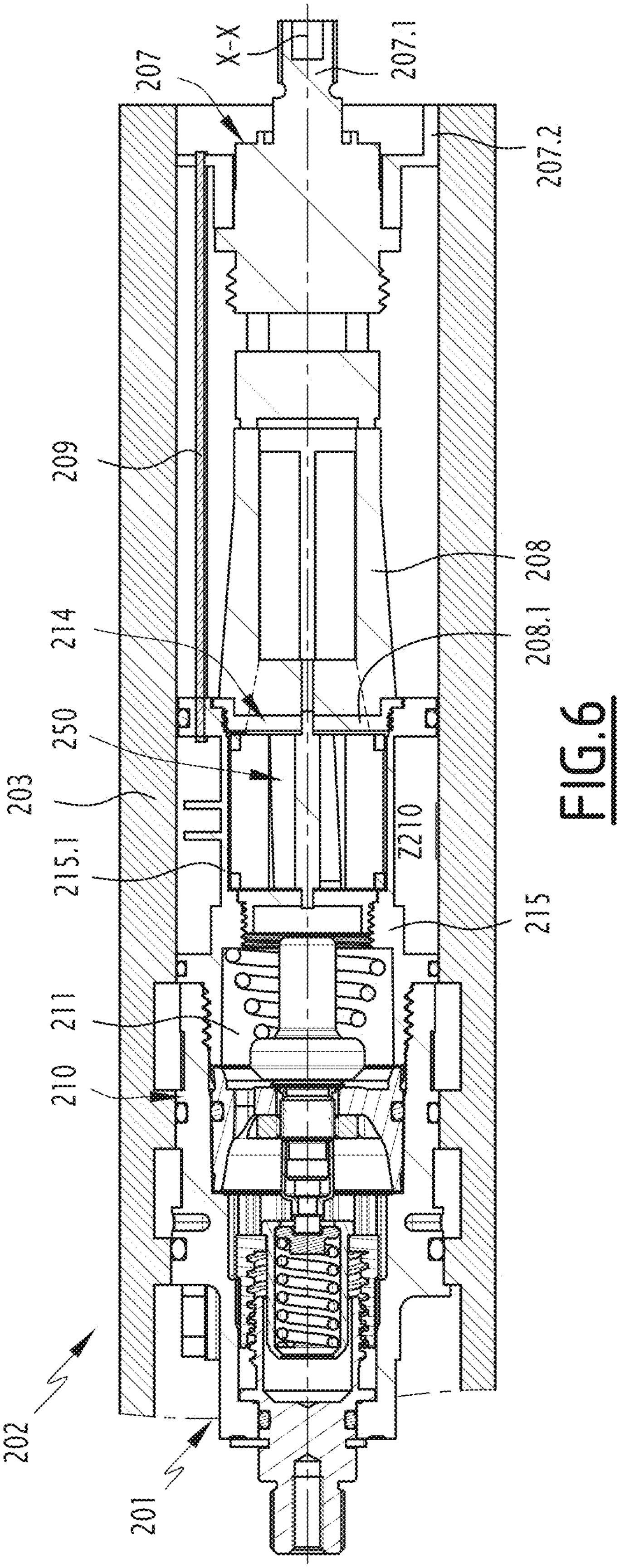
FIG. 6 is a section in plane VI of FIG. 5, the thermostatic cartridge being shown schematically within a mixer tap according to the invention.

FIGS. 5 and 6 show a thermostatic cartridge 201 and a mixer tap 202 which are functionally similar to the thermostatic cartridge 1 and to the mixer tap 2, respectively. In this respect, the thermostatic cartridge 201 includes, inter alia, a casing 210 and a turbine 250 which are functionally, or even structurally, similar to the casing 10 and to the turbine 50, respectively, of the thermostatic cartridge 1. The casing 210 delimits, among others, a dry zone Z210, a chamber 211 and a mixed fluid outlet 214, which are similar to the dry zone Z10, to the chamber 11 and to the mixed fluid discharge 14, respectively. In addition, the casing 210 includes a housing 215, which is functionally similar to the housing 15 and which includes a tubular wall 215.1 which is similar to the tubular wall 15.1. Moreover, the mixer tap 202 includes, inter alia, a tap body 203 and a flow-rate regulating device 207, which are similar to the tap body 3 and to the regulating device 7, respectively, of the mixer tap 2.

The mixer tap 202 equipped with the thermostatic cartridge 201 differs from the mixer tap 2 equipped with the thermostatic cartridge 1 by two distinct aspects, which will be presented in detail hereinbelow and which are independent of each other.

Concerning the first of the two aspects, the mixer tap 202 includes a connection piece 208 which is arranged inside the tap body 203 and which connects the mixed fluid discharge 214 to the flow-rate regulating device 207 by channeling the mixed fluid. The connection piece 208 thereby serves to channel the mixed fluid between the thermostatic cartridge 201 and the flow-rate regulating device 207 inside the tap body 203, in particular without resorting to channels integrated into the thickness of the wall of the tap body 203, since the production of such channels may be complex and expensive.

In addition, the connection piece 208 includes, as an integral part, a bearing 208.1 which fulfills the same function as the bearing 15.3 of the thermostatic cartridge 1. In other words, the bearing 208.1 integrated into the connection piece 208 supports and guides in rotation about the axis X-X a central hub of the turbine 250, while being fixedly arranged inside the tubular wall 215.1 and allowing therethrough the mixed fluid flowing in the chamber 211 toward the mixed fluid discharge 214. In practice, the bearing 208.1 is located, along the axis X-X, at the mixed fluid discharge 214.

As regards the second of the two aforementioned aspects, the flow-rate regulating device 207 includes a control member 207.1, which is functionally similar to the control member 7.1 and which is provided to move relative to the tap body 203, in particular in rotation about the axis X-X, for the purpose of controlling the flow-rate regulating device 207. The flow-rate regulating device 207 further includes a stop member 207.2, which is fixedly connected to the tap body 203 by any appropriate means, and which forms a stop for the control member 207.1 when the latter is moved relative to the tap body 203. The stop member 207.2 is typically used to block the movement of the control member 207.1 in a remarkable position, e.g. to embody a water-saving position, where the remarkable position can be overcome by a mechanical action of the user enabling the control member 207.1 to go beyond the stop member 207.2.

In addition, the mixer tap 202 includes a connection member 209 which is clearly visible in FIG. 5 and which, as shown in FIG. 6, extends inside the tap body 203 from the dry zone Z210 to the stop member 207.2. The connection member 209 enables light waves and/or electromagnetic waves, such as WiFi waves or Bluetooth waves, to be transmitted to the stop member 207.2, which are generated in the dry zone Z210 by electrical and/or electronic components arranged in the dry zone and supplied with electricity by the hydroelectric production function of the cartridge 201. As a non-limiting example, the connection member 209 comprises a waveguide. It should be understood that, whatever the embodiment thereof, the connection member 209 makes it possible to bring the light and/or electromagnetic waves generated in the dry zone Z210 to a region of the mixer tap 2, namely the stop member 207.2 of the flow-rate regulating device 207, where the waves can easily be used from outside the tap body 203 and/or transmitted outside the tap body 203, while being substantially less hindered by the presence of the tap body 203.

Finally, various arrangements and variants of the thermostatic cartridges 1, 101, and 201 and of the mixer taps 2 and 202 described so far, are conceivable. Examples include:

the arrangements which are specific to the cartridges 1, 101 and 201, respectively, are applicable to other thermostatic cartridges; and/or as an optional arrangement, the thermostatic cartridge 1, 101 or 201 includes, at the mixed fluid discharge thereof, an excess flow valve in order to prevent the turbine from being rotated at excessively high speeds when the flow-rate of the mixed fluid in the chamber is high; the excess flow valve includes e.g. a rubber packing, the shape of which varies according to the pressure of the mixed fluid so as to reduce the flow-rate therethrough when the pressure of the mixed fluid increases.

The invention relates to a cartridge which comprises a casing (10) to be fitted integrally in a tap body (3), as well as a thermostatic element (30) controlling the position of a slide valve (20) for regulating the temperature of a mixed fluid formed by mixing hot and cold fluids in a chamber (11) of the casing. The cartridge comprises a turbine (50) supported by the casing by being arranged in the chamber so as to be rotated about an axis (X-X) of the chamber by the mixed fluid flowing in the chamber towards a mixed fluid outlet (14). The cartridge incorporates at least one permanent magnet (60), supported by the turbine so as to be rotated about the axis together with the turbine, and at least one coil (70) fixedly arranged on an outer face (10A) of the casing through which the hot and cold fluids enter the chamber, so that the magnet generates an electric current in the coil by electromagnetic induction when the turbine rotates.

The invention claimed is:

1. A thermostatic cartridge, including:

a casing, which is suitable for being directly mounted in one piece in a tap body and having an internal volume forming a chamber which defines an axis and wherein a hot fluid and a cold fluid mix to form a mixed fluid, wherein said casing is provided with a hot fluid inlet through which hot fluid enters the chamber from an external face of the casing, a cold fluid inlet through which cold fluid enters the chamber from an outer face of the casing, and a mixed fluid discharge through which the mixed fluid flows from the chamber outside the casing, a thermostatic element, which includes a thermosensitive body, arranged in the chamber to be in contact with the mixed fluid, and a piston connected to the casing, the thermosensitive body and the piston moving relative to each other along the axis according to the temperature of the mixed fluid, a slide valve for regulating the temperature of the mixed fluid, the slide valve being connected to the thermosensitive body so as to be moved along the axis in the chamber so as to close, in opposite respective proportions, a hot fluid passage (P1) and cold fluid passage which are each delimited along the axis between the slide valve and the casing, the hot fluid passage being supplied by the hot fluid coming from the hot fluid inlet whereas the cold fluid passage is supplied by the cold fluid coming from the cold fluid inlet, and a turbine, which is supported by the casing so as to movable in rotation about the axis and which is arranged in the chamber in such a way that the turbine is rotated relative to the casing by the mixed fluid flowing in the chamber to the mixed fluid discharge, wherein the thermostatic cartridge incorporates:

at least one permanent magnet which is supported by the turbine to be rotated about the axis together with the turbine, and at least one coil, which is fixedly supported by the casing and which is arranged on the outer face of the casing in such a way that the at least one permanent magnet generates in the at least one coil, an electric current by electromagnetic induction when the turbine rotates about the axis relative to the casing.

2. The thermostatic cartridge according to claim 1, wherein the casing delimits, on the outer face (10A) thereof, a dry zone which is leak-tight with regard to the hot fluid, the cold fluid and the mixed fluid and wherein the at least one coil is arranged.

3. The thermostatic cartridge according to claim 2, wherein the thermostatic cartridge further includes one or a plurality of electrical and/or electronic components, which are at least partially arranged in the dry zone and which are supplied with electricity by the at least one coil.

4. The thermostatic cartridge according to claim 3, wherein the one or a plurality of electrical and/or electronic components include:

electrical connection pins, which are correspondingly connected to the terminals of said at least one coil, and/or conductors of a printed circuit, and/or a temperature sensor which is supported by the casing passing through the casing in a sealed manner, extending from a first end, interacting by contact with the hot fluid, the cold fluid or the mixed fluid, at a second end, emerging into the dry zone and supplying an electrical signal representative of the effect of the temperature on the first end.

5. The thermostatic cartridge according to claim 1, wherein the casing includes first and second housings which are distinct from each other and which are fixedly secured to each other in succession along the axis, wherein the hot fluid passage is axially delimited between the slide valve and one of the first and second housings whereas the cold fluid passage is axially delimited between the slide valve and the second housing, and wherein the first housing delimits the mixed fluid discharge and supports both the turbine and the at least one coil.

6. The thermostatic cartridge according to claim 5, wherein the first housing includes a tubular wall, which is centered on the axis, inside which the turbine is arranged, and which is transparent to the magnetic field generated by the at least one permanent magnet, and wherein said at least one permanent magnet and said at least one coil are arranged on both sides, radially to the axis, of said tubular wall.

7. The thermostatic cartridge according to claim 6, wherein the first housing also includes bearings which:

are each fixedly arranged inside said tubular wall while allowing therethrough the mixed fluid flowing in the chamber toward the mixed fluid discharge, and support and guide in rotation about the axis a central hub of the turbine.

8. A mixer tap, comprising:

a thermostatic cartridge according to claim 1, a tap body, inside which the thermostatic cartridge is arranged so that the hot fluid inlet is connected to a hot fluid inlet, through which hot fluid is fed into the tap body, so that the cold fluid inlet is connected to a cold fluid inlet through which the cold fluid is fed into the tap body, and that the mixed fluid discharge is connected to a mixed fluid outlet through which the mixed fluid flows from the inside to the outside of the tap body, and a flow-rate regulating device which is arranged inside the tap body and which is suitable for regulating the flow-rate of mixed fluid sent to the mixed fluid outlet from the thermostatic cartridge.

9. The mixer tap according to claim 8, wherein the mixer tap further includes a connection piece, which is arranged inside the tap body and which connects the mixed fluid discharge to the flow-rate regulating device by channeling the mixed fluid, wherein the casing includes first and second housings which are distinct from each other and which are fixedly secured to each other in succession along the axis, wherein the hot fluid passage is axially delimited between the slide valve and one of the first and second housings whereas the cold fluid passage is axially delimited between the slide valve and the housing, wherein the first housing delimits the mixed fluid discharge and supports both the turbine and the at least one coil, wherein the first housing includes a tubular wall, which is centered on the axis, inside which the turbine is arranged, and which is transparent to the magnetic field generated by the at least one permanent magnet, wherein said at least one permanent magnet and said at least one coil are arranged on both sides, radially to the axis, of said tubular wall, wherein the first housing also includes bearings which:

are each fixedly arranged inside said tubular wall while allowing therethrough the mixed fluid flowing in the chamber toward the mixed fluid discharge, and support and guide in rotation about the axis a central hub of the turbine, and wherein one of the bearings is integrated into the connection piece.

10. The mixer tap according to one of claim 8, wherein the flow-rate regulating device includes:

a control member which is movable relative to the tap body, and a stop member, which is fixedly connected to the tap body and forms a stop for the control member during the movement of the latter relative to the tap body, wherein, the casing delimits, on the outer face thereof, a dry zone which is leak-tight with regard to the hot fluid, the cold fluid and the mixed fluid and wherein the at least one coil is arranged and wherein the mixer tap further includes a connecting member, which extends, inside the tap body, from the dry zone to the stop member and which is suited for transmitting light and/or electromagnetic waves generated in the dry zone, to the stop member.

* * * * *